(12) United States Patent
Jeansonne et al.

(10) Patent No.: US 9,218,037 B2
(45) Date of Patent: Dec. 22, 2015

(54) COMPUTATION OF SYSTEM ENERGY

(75) Inventors: Jeffrey K. Jeansonne, Houston, TX (US); Frederick L. Lathrop, Spring, TX (US); Jon G. Lloyd, Cypress, TX (US); Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 13/142,454

(22) PCT Filed: Jan. 31, 2009

(86) PCT No.: PCT/US2009/032762
§ 371 (c)(1),
(2), (4) Date: Jun. 28, 2011

(87) PCT Pub. No.: WO2010/087859
PCT Pub. Date: Aug. 5, 2010

(65) Prior Publication Data
US 2011/0270549 A1 Nov. 3, 2011

(51) Int. Cl.
*G06F 19/00* (2011.01)
*G06F 1/32* (2006.01)

(52) U.S. Cl.
CPC ............ *G06F 1/3203* (2013.01); *G06F 1/3246* (2013.01)

(58) Field of Classification Search
CPC .............. G06F 19/00; G06F 1/26; G06F 1/32
USPC ................ 702/60–65; 713/300–340; 715/771
See application file for complete search history.

(56) References Cited

U.S. PATENT DOCUMENTS

| | | | | |
|---|---|---|---|---|
| 5,532,935 A * | 7/1996 | Ninomiya et al. | ............ | 700/296 |
| 5,884,233 A * | 3/1999 | Brown | ............ | 702/61 |
| 6,480,964 B1 | 11/2002 | Oh | | |
| 6,956,500 B1 * | 10/2005 | Ducharme et al. | ....... | 340/870.02 |
| 7,209,838 B1 * | 4/2007 | Wright et al. | .............. | 702/60 |
| 7,243,243 B2 * | 7/2007 | Gedeon | ........... | 713/300 |
| 7,330,984 B2 | 2/2008 | Wu et al. | | |
| 7,539,881 B2 * | 5/2009 | Shaw et al. | ........... | 713/300 |
| 7,629,971 B2 * | 12/2009 | Plut | ............. | 345/211 |
| 8,051,319 B2 * | 11/2011 | Huang et al. | ........... | 713/340 |
| 8,386,816 B2 * | 2/2013 | Elsila et al. | ........... | 713/320 |

(Continued)

FOREIGN PATENT DOCUMENTS

| | | |
|---|---|---|
| CN | 1592878 A | 3/2005 |
| CN | 1804761 A | 7/2006 |

(Continued)

OTHER PUBLICATIONS

International Searching Authority, International Search Report and Written Opinion, Appln No. PCT/US2009/032762. date of mailing Oct. 30, 2009. 11 p.

(Continued)

*Primary Examiner* — Mohamed Charioui
*Assistant Examiner* — Ruihua Zhang
(74) *Attorney, Agent, or Firm* — Conley Rose

(57) ABSTRACT

A system comprises an energy source that provides a system current for the system. The system also comprises logic coupled to the energy source. The logic receives an analog signal that is derived from a measurement of current in the system and computes an amount of energy consumed by the system based on the analog signal.

20 Claims, 5 Drawing Sheets

(56) References Cited

U.S. PATENT DOCUMENTS

| | | |
|---|---|---|
| 2001/0000423 A1* | 4/2001 | Fischer et al. ............... 320/114 |
| 2004/0003301 A1 | 1/2004 | Nguyen |
| 2004/0199800 A1* | 10/2004 | Yu et al. ..................... 713/320 |
| 2005/0270283 A1 | 12/2005 | Plut |
| 2006/0015758 A1* | 1/2006 | Yoon et al. .................. 713/300 |
| 2006/0156042 A1 | 7/2006 | Desai et al. |
| 2006/0174143 A1* | 8/2006 | Sawyers et al. ............. 713/300 |
| 2008/0201587 A1* | 8/2008 | Lee .............................. 713/320 |
| 2008/0229226 A1* | 9/2008 | Rowbottom et al. ......... 715/771 |
| 2009/0158072 A1* | 6/2009 | Radhakrishnan ... G06F 11/3433 713/340 |
| 2009/0171511 A1* | 7/2009 | Tolentino ............... G06F 1/266 700/297 |
| 2009/0222907 A1* | 9/2009 | Guichard ........................ 726/17 |
| 2009/0271645 A1* | 10/2009 | Mori ..................... G06F 1/3221 713/320 |
| 2009/0302831 A1* | 12/2009 | Adams et al. ................ 324/142 |

FOREIGN PATENT DOCUMENTS

| | | |
|---|---|---|
| CN | 101111816 A | 1/2008 |
| JP | 1993-172859 | 7/1993 |
| JP | 1996-509081 | 9/1996 |
| JP | 1999-202984 | 7/1999 |
| JP | 2005-085027 | 3/2005 |
| JP | 2005-165653 | 6/2005 |
| JP | 2008-538020 | 10/2008 |
| WO | WO-2008/146984 | 12/2008 |

OTHER PUBLICATIONS

Examination Report Under Section 18(3) received in GB Application No. 1112697.6, mailed Aug. 20, 2013, 5 pgs.
Examination Report Under Section 18(3), received in GB Application No. 1112697.6, mailed on Dec. 3, 2013, 4 pgs.
HPDC, Chinese Office Action Search Report dated Jun. 18, 2013, CN App. No. 200980155757.5, filed Jan. 31, 2009, 3 p.

* cited by examiner

COMPUTATION OF SYSTEM ENERGY

BACKGROUND

The acceptance of computing devices (such as personal computers) has lead to a proliferation of such devices in virtually all aspects of business and life in general. The sheer volume of computers that are now being deployed brings new challenges to the computer industry in terms of the impact on the environment. One of these challenges is the overall electrical power consumed by the computers from the electrical grid. The effect of a single computer is generally minimal, but the combined effect on the power grid of thousands or millions of computers can be substantial.

In general, while understanding the instantaneous rate of power draw (measured in watts) of a computer at any given time may be helpful, understanding the total energy consumption (i.e., "energy" measured in units of watt-hours) may be more helpful to understanding and controlling the usage of electrical power. Present computer technology is quite limited in its ability to determine and report energy usage of a computer (such as a client computer).

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "energy" refers to a quantity of electrical energy that is used over a period of time. The term "power" means the rate (e.g., instantaneous rate) at which electrical energy is used and is computed by multiplying current by voltage. Power is typically expressed in units of "watts." Energy is typically expressed in units of watt-hours.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
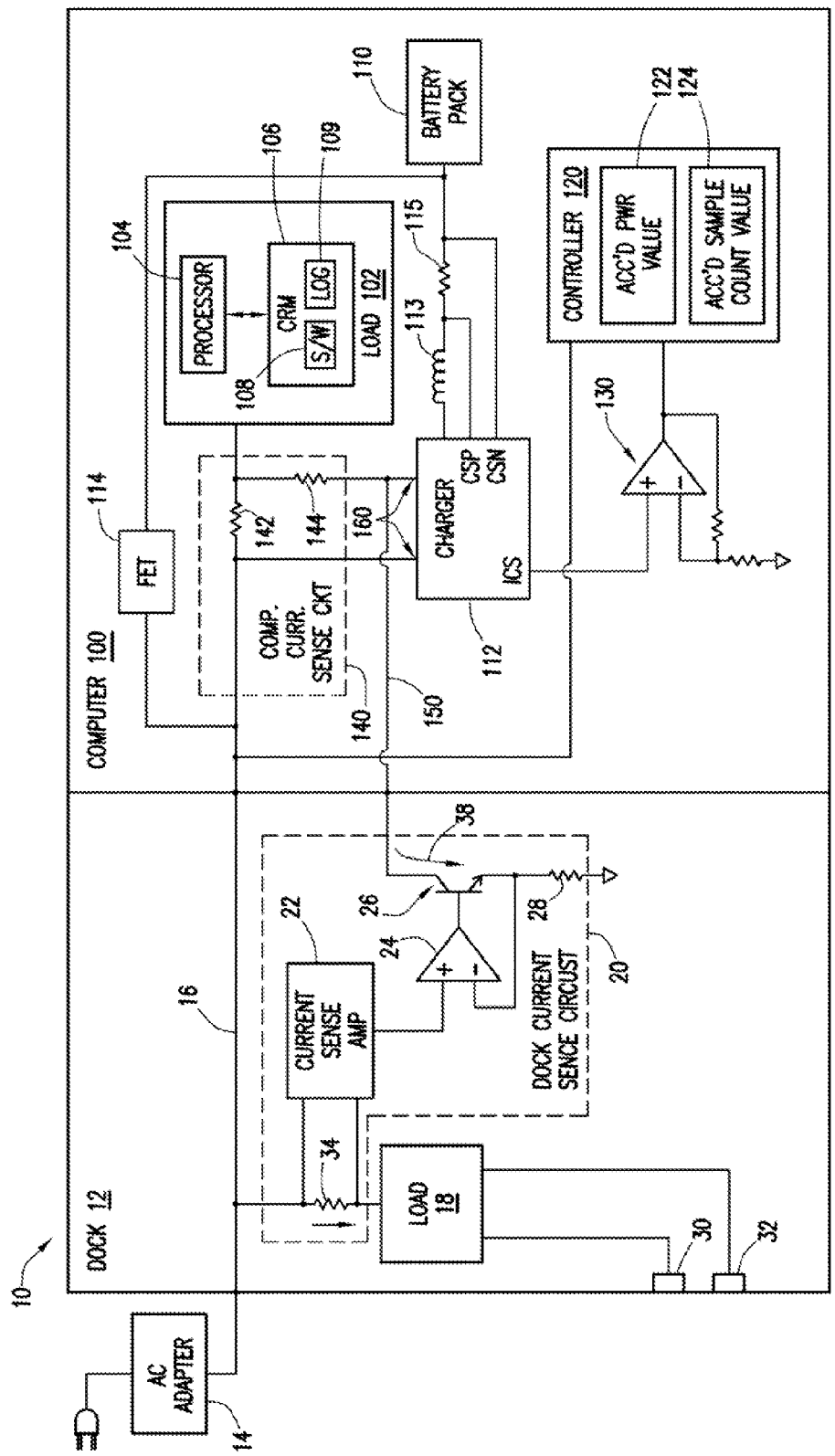
FIG. 1 shows a system in accordance with various embodiments.

FIG. 1 shows an embodiment of a computer system 10. As shown, computer system 10 comprises a computer 100 coupled to a docking station ("dock") 12. In some embodiments, the computer 100 may comprise a battery powered computer such as a notebook computer. The computer 100 includes a battery pack 110 for providing power when not connected to dock 12 or any source of alternating current (AC) power. When the computer 100 is coupled to the dock 12, an AC adapter 14 provides DC (direct current) electrical current on conductor 16 to electronics both in the dock 12 and the computer 100. In some embodiments, the AC adapter 14 may be connected directly to the computer 100 without the computer 100 being coupled to the dock 12.

The computer 100 comprises a load 102, battery pack 110, a battery charger 112, and a controller 120. The battery pack 110 provides electrical current through a Field Effect Transistor (FET) 114 to the load 102. The battery charger 112 is operable when the computer 100 receives current from the AC adapter 14. The battery charger 112 provides charging current through inductor 113 and resistor 115 to battery pack 110.

The load 102 comprises one or more components that provide the computer 100 with its functionality. For example, load 102 comprises a processor 104 and a computer readable medium (CRM) 106. The computer readable medium 106 comprises volatile memory (e.g., random access memory), non-volatile storage (e.g., hard disk drive, compact disk drive, read-only memory, etc.) or combinations thereof. One or more software applications 108 are stored on the computer readable medium 106 and executed by processor 104.

The controller 120 comprises an embedded controller such as a keyboard controller. The controller 120 includes non-volatile storage for various values such as an accumulated power value 122 and an accumulated sample count value 124. The controller 120 includes firmware that, when executed by the controller 120, provides the controller with the functionality described herein.

The dock 12 includes one or more external connectors 30 and 32 to provide external connectivity to the dock 12 and computer 100 by, for example, external networks, external peripheral devices, etc. The load 18 in the dock 12 comprises one or more components of the dock such as a network interface controller, hard disk drive, a video interface, etc.

When the AC adapter 14 is connected to dock 12, and computer 100 is also coupled to dock 12, the AC adapter receives input AC voltage and current and converts the AC voltage/current to a DC output voltage and current that is provided along conductor 16 to loads 18 and 102. In such a configuration, the AC adapter 14 provides most or all of the operating power for the dock 12 and computer 100.

In accordance with various embodiments, the computer 100 computes the energy consumption of the computer when the computer 100 is operating in a stand alone mode (e.g., not coupled to the dock 12), as well as computing the energy consumption of the combined dock 12 and computer 100 when the computer 100 is coupled to the dock 12. The dock 12 includes a dock current sense circuit 20 and the computer 100 includes a computer current sense circuit 140. The illustrative embodiment of the dock's current sensor circuit 20 includes a sense resistor 34, current sense amplifier 22, an operational amplifier (op amp) 24, a transistor 26, and a resistor 28. Operational current from the AC adapter 14 flowing to the load 18 flows through current sensor resistor 34 thereby generating a voltage across the resistor proportional to the dock's current. The voltage across the current sense resistor 34 is provided to and amplified by the current sense amplifier 22. The amplified output voltage from the current sense amplifier 22 is provided to the op amp 24 which, in concert with the transistor 26 and resistor 28 converts the voltage output from the current sense amplifier 22 to a current. The current 38 thus flowing through the transistor 26 is proportional to the current flowing to the load 18 through the sense resistor 34 from the AC adapter 14.

Referring still to the illustrative embodiment of FIG. 1, the computer's computer current sense circuit 140 includes a pair of resistors 142 and 144. Current sense resistor 142 is connected in series with the current flow to the load 102 from the AC adapter 14. The resistor 144 is coupled between the current sense resistor 142 and charger 112 as shown. The voltage developed across current sense resistor 142 is thus a function of the operational current flowing to the load 102 from the AC adapter 14. The voltage across resistor 144 is a function of the current flowing to the load 18 in the dock 12 from the AC adapter 14. The voltage 160 across the combination of resistors 142 and 144 is thus a function of the total current provided to the computer 100 and dock 12 from the AC adapter 14.

The charger 112 receives the input voltage 160 from the computer's computer current sense circuit 140 and provides an output signal (ICS) to op amp 130. The voltage provided to op amp 130 from the ICS output of charger 112 is proportional to the combined current of the dock 12 and computer 100. OP amp 130 amplifies that voltage and provides the amplified voltage to the controller 120. The output voltage from the ICS terminal of the charger 112, and thus, the output of op amp 130, comprise an analog signal that is proportional to the combined current flowing to the load 102 of the computer 100 and the load 18 of the dock 12. In this disclosure, the analog signal refers to either the output ICS signal from the charger 112 or the output signal from the OP amp 130. The controller 120 receives the output analog signal from the op amp 130 and uses that signal for a subsequent computation of an amount of energy consumed by the system 10. The analog signal from charger 112/OP amp 130 is indicative of the output current from the battery in the situation in which the computer 100 is not connected to the dock 12 or AC adapter 14 and is thus only operating from battery power. However, when the computer 100 is connected directly to the AC adapter 14 (no dock 12), the analog signal is indicative of the output current from the AC adapter 14 to the computer's load 102. Further still, when the computer 100 is coupled to the dock 12 and the AC adapter 14 is connected to the dock, the analog signal from the charger 112/OP amp 130 to the controller 120 is indicative of the total operational current from the AC adapter 14 to both loads 18 and 102 in the dock 12 and computer 100, respectively. Thus, one circuit provides an indication of whatever operational current is being provided regardless of whatever energy source (battery 110, AC adapter) and configuration (standalone computer, computer/dock) is being used.

Power can be computed as the product of current and voltage. The output analog signal from the charger 112 (ICS output) or op amp 130 is a voltage that is proportional to the total operational current of the system 10. That voltage value is scaled, if and as appropriate, and multiplied by a value representative of the voltage that the system 10 receives from the AC adapter 14 or battery 110. That voltage may be provided directly to the controller 120 as shown in FIG. 1, or may be programmed into the controller.

Figure 2:
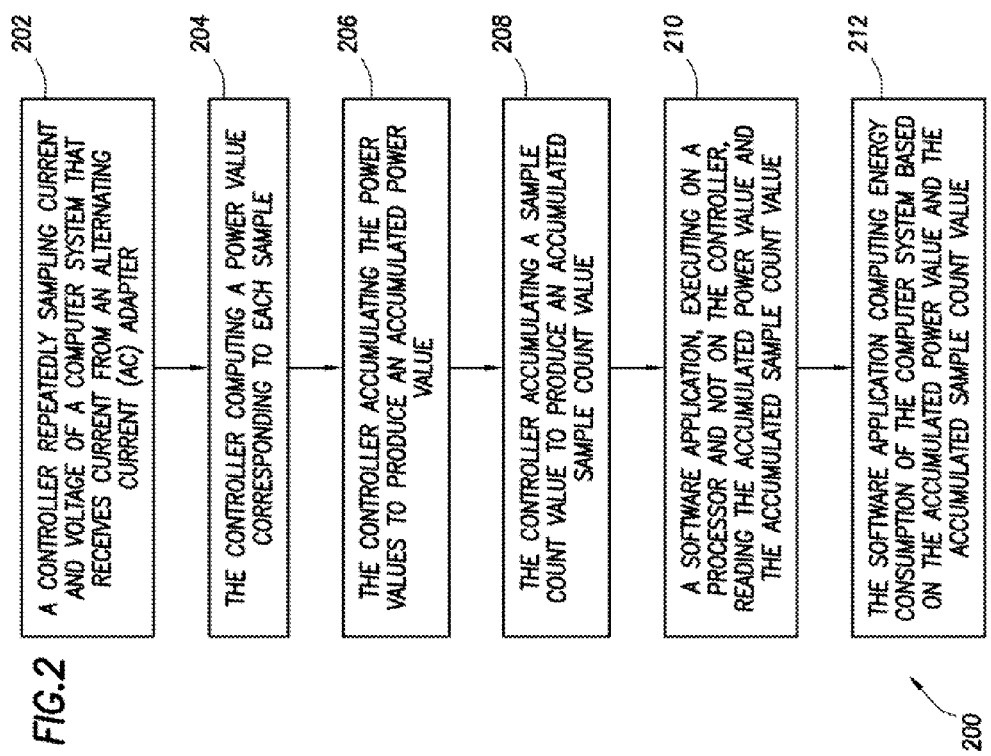
FIG. 2 shows a method in accordance with various embodiments.

In accordance with various embodiments, the energy computation is performed partially by the controller 120 and partially by the software 108 under execution by the processor 104. FIG. 2 shows an illustrative method 200 by which energy is computed by computer 100. The controller 120 repeatedly samples the current and voltage provided by the AC adapter 114 (or battery 110) to the system 10 (202). If the voltage is programmed into the controller 120, a voltage sample is not actually taken. The period of the sample can be set as desired such as at four times per second, once per second, etc. The software application 108 is also programmed for the same sample period. At 204, the controller 120 computes a power value corresponding to each sample. In at least some embodiments, the power value is computed by multiplying The sampled current by voltage. At 206, the controller accumulates the computed power values to produce the accumulated power value 122 which is stored in the controller. That is, each computed power value is added to a sum of all prior power values. At 208, the controller 120 also accumulates a sample count value to produce the accumulated count value 124. This action can be performed, for example, by the controller incrementing a counter to provide a value that, in some embodiments, specifies the number of samples over which the accumulated power value 122 has been computed. The controller 130 can monitor and store the power value, accumulated power value and accumulated count value even When the processor 104 is powered down (e.g., in the S3, S4, or S5 states—the system still receives power from the AC adapter 14, or uses the battery pack 110)

When the software application 108 is run on processor 104, the software application reads the accumulated power value 122 and the accumulated sample count value 124 from the controller 120 (210). At 212, the software application computes energy consumption of the system 10 based on the accumulated power value 122 and the accumulated sample count value 124. In some embodiments, this computation is performed by dividing the accumulated power value 122 by the accumulated sample count value 124 to compute an average power draw by the system 10. The software application 108 further multiplies the average power draw by an amount of time that corresponds to the accumulated count value. For example, if the software knows the sample period to be once/second and that the accumulated sample count value 124 is 3600, then the software determines that 3600 seconds (i.e., one hour) correspond to the accumulated sample count value and multiplies that time period (one hour) by the average power draw to compute energy (watt-hours).

Referring again to FIG. 1, the software application 108 mayalso create and/or update a log file 109 containing computed power and energy information. The log file 109 is stored on the computer readable medium 106. The information contained in the log file 109 may be the average power draw of the system (e.g., provided in watts) and the energy consumption by the system (e.g., provided in watt-hours). The software application 108 may store the power and/or energy values in the log file 109 periodically (e.g., once per minute, once per hour, etc.) or upon the occurrence of discrete events such as system state transitions (e.g., S0 to S4/S5, etc.). In some embodiments the log file 109 is of a "DAT" file format.

Figure 3:
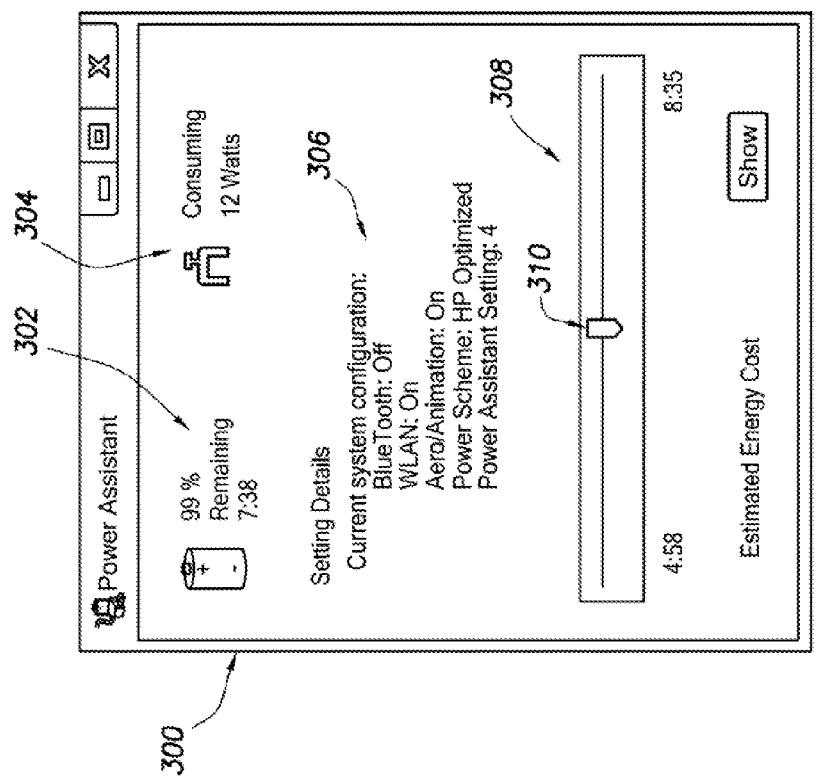

The software application 108 provides additional functionality as well. For example, the software application provides a graphical user interface (GUI) by which a user can view information about the power consumption of the system, and adjust the system's power consumption. FIG. 3 shows one exemplary GUI 300 by which the software application 108 illustrates that, at 302, the system 10 is operating from battery power (not an AC adapter), that the battery is 99% charged, and that at the present level of average power draw, the battery should last approximately another 7 hours and 38 minutes. The GUI also shows the average power draw of 12 watts (304). The GUI further shows, at 306, the present configuration settings for the system that achieves the displayed average power draw. As shown in the example of FIG. 3, the BlueTooth transceiver of the computer 10 has been turned off, the wireless LAN (local area network) transceiver has been turned on, the operating system's Aero and Animation support (part of the Vista operating system by Microsoft Corp.) has been turned on, the operating system's dynamic power scheme has been on an set to an optimized level (e.g., part of Vista and XP operating systems), and the power assistant setting is set at level 4.

Configuration settings 306 are based on how a user has adjusted a control 310 of a software slider 308 in some embodiments, or other software control mechanisms in other embodiments. The control 310 can be moved by the user (via, for example, a mouse) from one end of the slider 308 to the other and various locations in between. The left-hand side of the slider emphasizes system performance over power and the right-hand edge of the slider emphasizes energy conservation over performance. As can be seen, the control 310 has been set in the middle of the slider 308. For that position, the software application 108 has determined that the configuration settings listed above the slider are to be set as shown. As the user moves the control to one side or the other, the software application 108 will dynamically determine a new set of configuration settings corresponding to how the user has adjusted the slider 308. The slider 308 is thus usable by a user to specify a power/energy consumption target for computer system 10.

Figure 4:
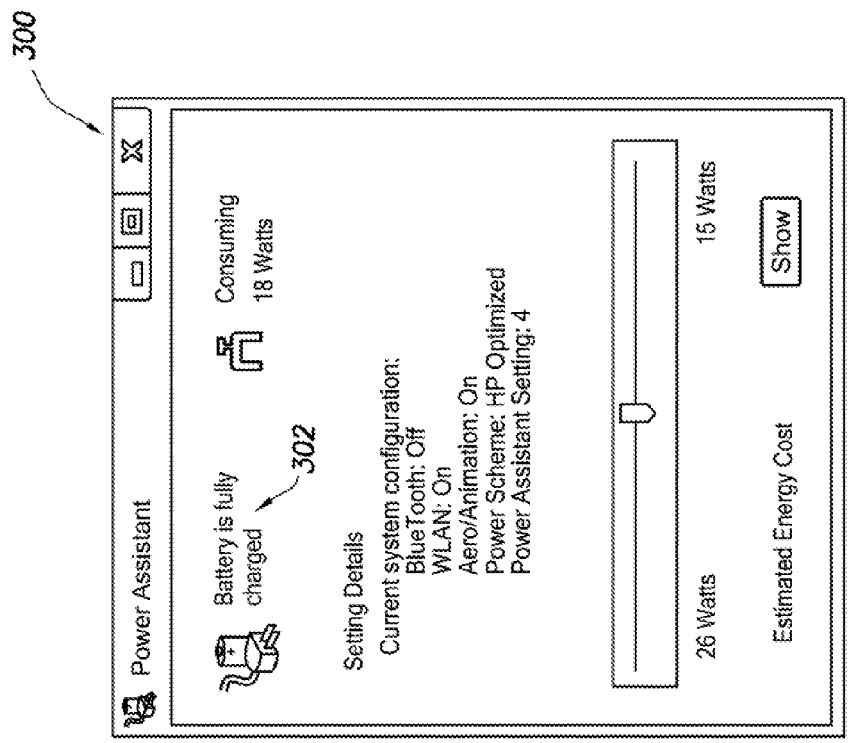
FIGS. 3-5 show various graphical user interfaces by which a user can control the power draw by a computer and see how the computer will reconfigure itself for different settings specified by the user, in accordance with various embodiments.
Figure 5:
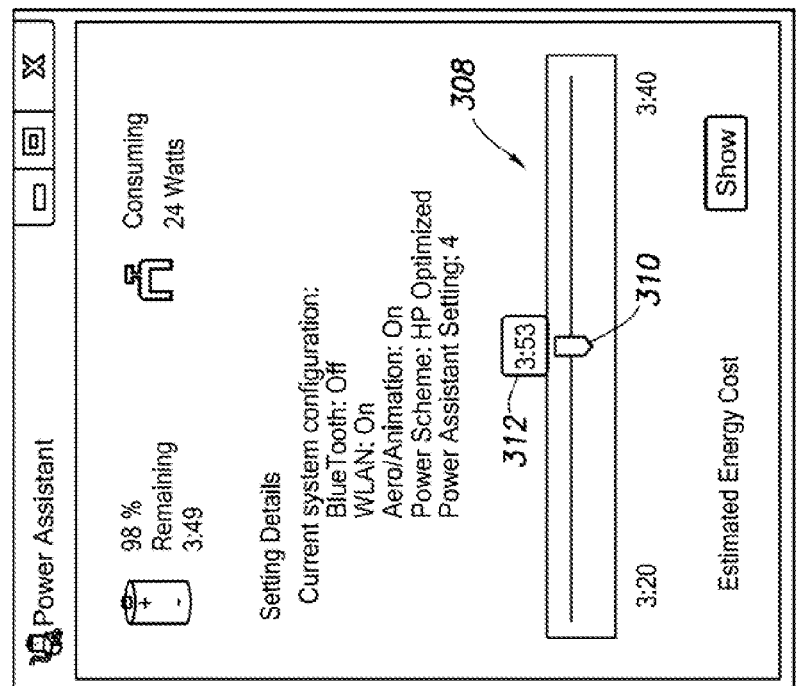

FIG. 4 shows the GUI 300 when the computer is connected to an AC adapter 114 or dock 12. The graphic shown at 302 depicts that the system 10 is connected to an AC adapter or dock and that the battery is fully charged. FIG. 5 shows the GUI in which the user has moved the control 310 to the center position. Before the user releases the control 310 (e.g., before the user releases the mouse button), the software application computes an estimate 312 of the remaining battery life that would result from that particular selected slider setting. The estimate shown in FIG. 5 is 3 hours and 53 minutes.

Figure 6:
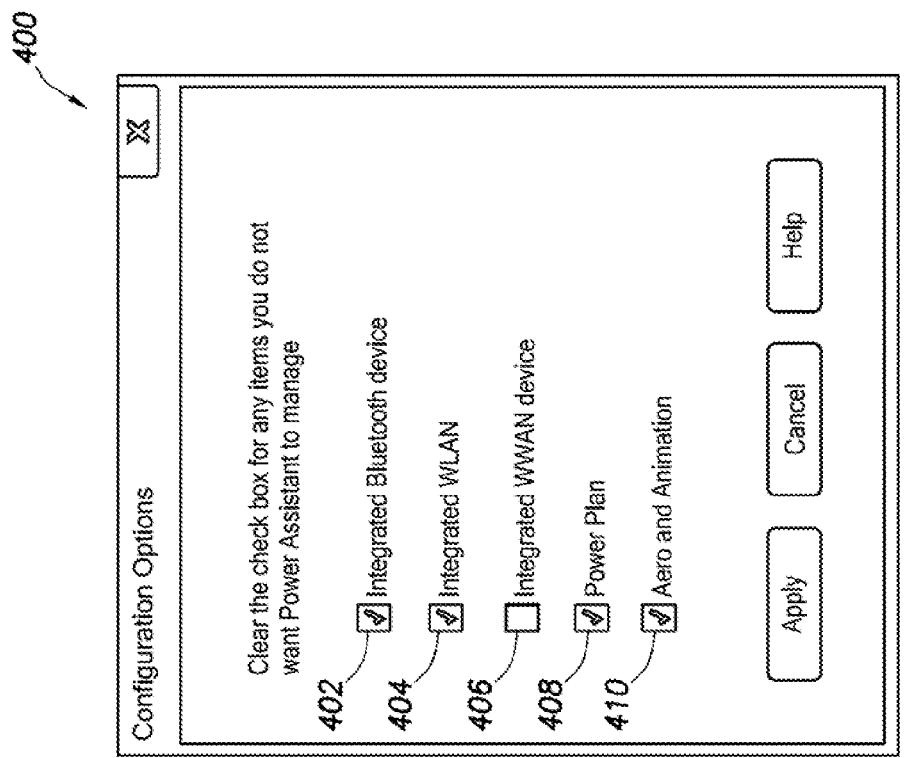
FIG. 6 shows a graphical user interface by which software in the computer can be configured in accordance with various embodiments.

The software application 108 can be programmed as for which system devices and features can be dynamically configured by the software application 108. FIG. 6 shows an illustrative GUI 400 that provides various check boxes for a user to be able to select/deselect which devices/features the user wants or does not want the software application 108 to dynamically configure based on the slider 308 setting. Check box 402 permits a user to specify whether the software application 108 is to have control over the BlueTooth transceiver of the computer 100 as the user selects different slider 308 settings. Additional check boxes 404-410 are also provided for the system's integrated wireless LAN transceiver, integrated wireless wide area network (WWAN) device, the Power Plan, and the Aero and Animation capability as well. In some embodiments, the software application 108 will only be able to dynamically turn on/off those devices/features permitted by the configuration GUI 400 of FIG. 6. For example, those items that are checked cannot be dynamically controlled by the software application 108 when a user adjusts the slider.

Figure 7:
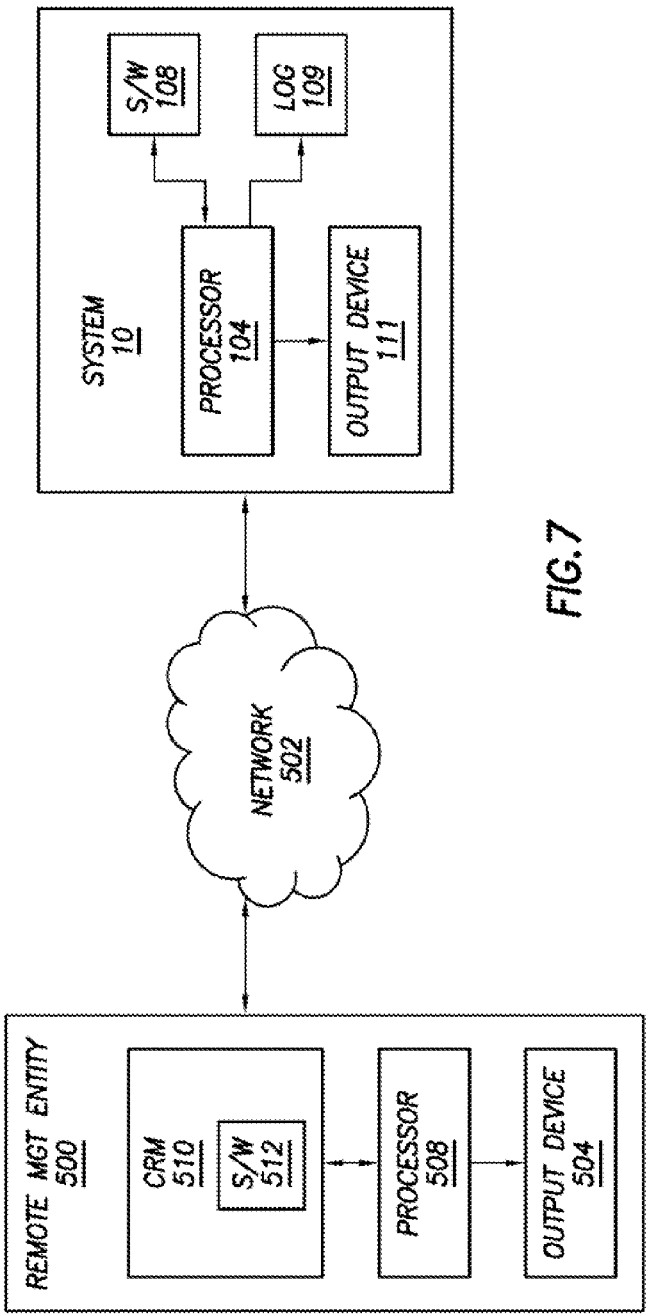
FIG. 7 shows a system in which a remote management entity accesses power and/or energy from a computer system via network, in accordance with various embodiments.

The example of FIG. 7 shows that system 10 can be accessed by a remote management entity 500 via a network 502. The network 502 comprises a LAN, a wide area network (WAN) (e.g., the Internet) or other types of networks. The remote management entity 500 comprises a computer such as a server executing software 512 that enables the remote management entity 500 to access the system 10. The software 512 is stored on a computer readable medium 510 and is executed by a processor 508 to provide the remote management entity 500 with the functionality described herein. The remote management entity 500 also comprises an output device 504 such as a display device or printer.

Figure 8:
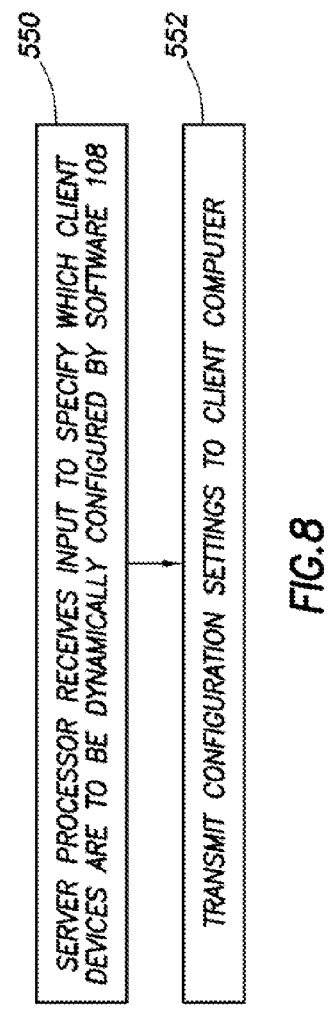
FIG. 8 shows another method in accordance with various embodiments.

At least one of the functions performed by the remote management entity is to limit which devices can be dynamically configured by the system 10 (which represents a "client" to the remote management entity ("server"). FIG. 8 shows an illustrative method in which, at 550, the server's processor 508 receives input from a user of remote management entity 500. The input specifies which devices (e.g., BlueTooth transceiver, WLAN transceiver, WWAN transceiver, etc.) in the client computer (e.g., system 10) are to be dynamically configured by the software 108 in the client computer. At 552, the illustrative method of FIG. 8 comprises the server's processor 508 transmitting configuration settings to the client computer (system 10) relaying such user input to prevent the software 108 in the client computer from being able to dynamically configure one or more devices specified in the transmitted configuration settings. The client computer accepts the configuration settings from the server and configures its own software 108 accordingly. If, for example, a user of the remote management entity 500 specifies that the software 108 is not to dynamically control its BlueTooth transceiver, then a user of software 108 will not be able to select the BlueTooth transceiver to be dynamically configured to achieve power settings in accordance with slider control 310 selection. In such embodiments, the software 108 cannot override the limitation imposed on it by the remote management entity 500. The server processor 508 may also be configured to override control over whether an icon pertaining to software 108 is to be displayed in the client computer's desktop "system tray," the refresh rate at which the software 108 updates its data (e.g., cost of energy usage for the computer, etc.) on a display, and whether the software 108 computes electricity cost (cost of electricity to operate the computer) or whether the operational cost calculation is performed by the remote management entity. Unit electricity cost can be manually programmed into the client computer system 10 or the remote management entity 500.

The remote management entity 500 has various additional settings including an agent-only mode that defines whether the software 108 is available to be run on the client computer, an installation block that prevents a user from installing the software 108 and the data collection rate that specifies the frequency at which data (e.g., power, energy, etc.) is collected from system 10. The remote management entity 500 also can access and read the log file (or path to the log file) for system 10. The remote management entity 500 also may have access (e.g., read access) to calibration status and current gain/offset values that are used by the software 108 to account for tolerance variations in, for example, resistors 142, 144 from one system 10 to another.

At least one other function performed by the remote management entity 500 is to access the log file 109 of one or more systems 10. The power draw and energy data can thus be read from the log file by the remote management entity 500 or the remote management entity 500 can have a copy of the log file transferred to the remote management entity 500 over the network 502. The remote management entity 500 can process and/or display the information from the log file 109. The remote management entity 500 may collect log file information from multiple systems 10, aggregate their data and graphically display the results of such an aggregation on the output device 504. The displayed information may be in graphical form such as line charts, bar charts, pie charts, etc.

The system 10, as shown in FIG. 7, also comprises an output device 111, which in at least some embodiments comprises a display device or printer. The software application 108 enables a user of the system 10 to view the contents of the log 109. In at least some embodiments, the log file information can be shown in graphical form such as with a pie chart, bar chart, etc.

Figure 9:
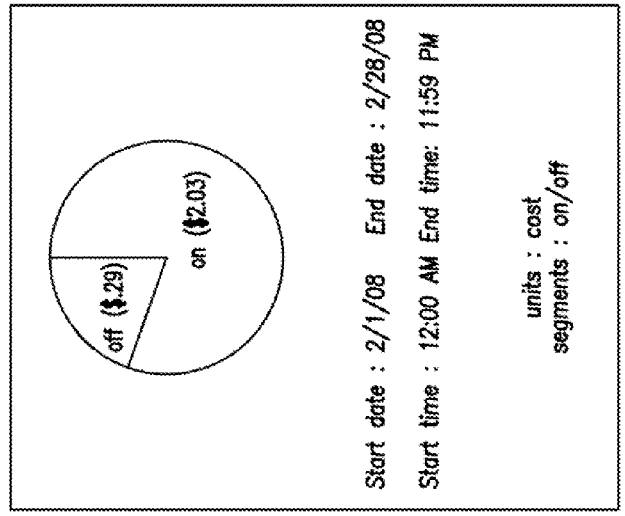
FIG. 9 shows an illustrative graphical display in accordance with various embodiments.

FIG. 9 shows an exemplary graphical user interface displayable on output device 111 (FIG. 7) in which the computer system 10 (e.g., software 108) has computed the cost to operate the client computer while such computer is off and also while such computer is on during a specified date/time range. A user interacts with the graphical user interface to specify the date/time ranges, the units (cost) to be computed and displayed and the segments (on/off) of the chart. Clicking on the "draw" button causes the pie chart shown in FIG. 9 to be displayed. A bar chart could additionally or alternatively be displayed with the y-axis representing time and the x-axis representing the unit selection. A line graphs would be similar to bar and pie charts, but would track each segment selection (on, off) as a separate line over time instead of a bar or pie wedge. This capability enables a user to better understand the energy consumption of the computer system 10.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
a display
a power source to provide a system current; and
a set of hardware components to implement logic to compute an amount of energy consumed by the computer system over a given duration of time, the logic computing the amount of energy based on (i) a measurement of the system current, and (ii) a user selected system configuration; and
wherein the logic provides, on a display, a graphical user interface that includes information about the amount of energy consumed by the computer system over the given duration of time, including information about an estimated energy cost data, the amount of energy consumption, and a configuration setting; and
wherein the logic determines a target energy consumption based on a user interaction with the graphical user interface, and updates the user selected configuration based on the target energy consumption.

2. The system of claim 1 wherein the set of hardware components include a controller that periodically samples an analog signal that carries the measurement of the system current, computes a power value from the analog signal, and accumulates power values to generate an accumulated power value.

3. The system of claim 2 wherein said controller also accumulates a sample count value pertaining to said accumulated power value.

4. The system of claim 3 wherein the set of hardware components also include a processor, and wherein the logic includes software executed by the processor to compute the amount of energy based on said accumulated power value and said accumulated sample count value.

5. The system of claim 3 wherein the set of hardware components also include a processor, and wherein the logic includes software executed by the processor to divide said accumulated power value by said accumulated sample count value to compute an average power value.

6. The system of claim 5 wherein said software computes the amount of energy by multiplying said average power value by an amount of time corresponding to said accumulated sample count value.

7. The system of claim 1 wherein said set of hardware components receive a first analog signal that carries the measurement of the system current, and second analog signal that is indicative of voltage in said computer system, and wherein the logic is implemented to compute the amount of energy consumed based on both said first and second analog signals.

8. The system of claim 1 wherein said energy source comprises an AC adapter.

9. The system of claim 1 wherein the computer system also comprises a dock, said dock including a dock current sense circuit, and wherein the computer system includes a computer current sense circuit, wherein current flowing through the computer current sense circuit is a function of current flowing through said dock current sense circuit.

10. The system of claim 9 further comprising a battery charger, wherein said computer current sense circuit is connected across input terminals of said battery charger to provide said battery charger with an input voltage that is derived from the current in the computer system and the current in said dock.

11. The system of claim 10 wherein said battery charger generates said analog signal to be provided to said logic.

12. A method, comprising:
repeatedly sampling, by a controller, current of a computer system that receives current from an alternating current (AC) adapter;
computing, by the controller, a power value corresponding to each sampled current;
accumulating, by the controller, said power values to produce an accumulated power value;
accumulating, by the controller, a sample count value to produce an accumulated sample count value;
executing a software application on a processor and not said controller to read the accumulated power value and the accumulated sample count value;
computing, by the software application, energy consumption of the computer system over a given duration of time based on said accumulated power value and the accumulated sample count value; and
providing, in graphical form, information about the amount of energy consumed by the computer system over the given duration of time, including estimated energy cost data, the energy consumption, and a configuration setting;
determining a target energy consumption based on a user interaction with the graphical user interface; and updating the user selected configuration based on the target energy consumption.

13. The method of claim 12 wherein the controller repeatedly sampling current of the computer system comprises the controller repeatedly sampling AC adapter current flowing through a dock and through the computer system.

14. The method of claim 12 further repeatedly sampling voltage of the computer system and the controller computing the power value by multiplying the sampled current by the sampled voltage.

15. The method of claim 12 wherein the controller stores said accumulated power value and said accumulated count value in non-volatile storage of said controller.

16. The method of claim 12 wherein the software application divides said accumulated power value by said accumulated sample count value to produce an average power value.

17. The method of claim 13 wherein the software application multiplies said average power value by a time period corresponding to said accumulated count value to compute the energy consumption of the computer system.

18. The method of claim 12 further comprising the software application logging the computed energy consumption to a file on a disk drive.

19. A system, comprising:
a processor; and
storage coupled to said processor, said storage containing a software application executable by said processor;
said processor, under execution by said software application obtains an energy consumption value of a computer operating from an alternating current (AC) adapter and provides information about the amount of energy consumed by the computer system over the given duration of time, including said energy consumption value, estimated energy cost data, and a configuration setting to a user of the system in graphical form;
wherein the processor determines a target energy consumption based on a user interaction with the graphical user interface, and
updates the user selected configuration based on the target energy consumption.

20. The method of claim 12, further comprising:
receiving configuration settings from another computer system to prevent software in the computer system from being able to dynamically configure one or more devices specified in the received configuration settings.

* * * * *

UNITED STATES PATENT AND TRADEMARK OFFICE
CERTIFICATE OF CORRECTION

PATENT NO. : 9,218,037 B2  
APPLICATION NO. : 13/142454  
DATED : December 22, 2015  
INVENTOR(S) : Jeffrey K Jeansonne et al.

Page 1 of 1

It is certified that error appears in the above-identified patent and that said Letters Patent is hereby corrected as shown below:

Claims
In column 7, line 56, in Claim 1, delete "a" and insert -- the --, therefor.

Signed and Sealed this
Nineteenth Day of April, 2016

Michelle K. Lee
*Director of the United States Patent and Trademark Office*